United States Patent
DiNunzio

[11] Patent Number: 6,056,424
[45] Date of Patent: May 2, 2000

[54] APPARATUS FOR REDUCING GLARE IN A VEHICLE AND ASSOCIATED METHOD

[76] Inventor: Charles DiNunzio, 200 Virginia Ave., Pgh., Pa. 15215

[21] Appl. No.: 09/103,216

[22] Filed: Jun. 23, 1998

[51] Int. Cl.$^7$ ................................................... B60Q 1/00
[52] U.S. Cl. .......................... 362/490; 362/503; 362/492; 362/494; 362/488; 362/487
[58] Field of Search ..................................... 362/503, 492, 362/490, 494, 488, 487

[56] References Cited

U.S. PATENT DOCUMENTS

| | | | |
|---|---|---|---|
| 1,929,298 | 10/1933 | Wessels ..................................... | 362/510 |
| 2,277,784 | 3/1942 | Schlemmer et al. ..................... | 362/227 |
| 2,484,796 | 10/1949 | Ackerman ................................ | 362/503 |
| 3,630,567 | 12/1971 | Cook ........................................ | 362/293 |
| 5,546,290 | 8/1996 | Gonzalez et al. ........................ | 362/488 |

*Primary Examiner*—Sandra O'Shea
*Assistant Examiner*—Ronald E. DelGizzi
*Attorney, Agent, or Firm*—Arnold B. Silverman; Eckert Seamans Cherin & Mellott, LLC

[57] ABSTRACT

A vehicle having glare-reducing apparatus has a windshield and a driver's seat disposed rearwardly of the windshield. An elongated light source is disposed adjacent to and extends across a substantial portion of the windshield such that light emitted by the light source will impinge on both eyes of the driver generally equally and constrict the pupils of the driver's eyes. In a preferred form, the light source is substantially continuous and may be a fluorescent bulb or a neon bulb. The light source is preferably positioned above the windshield and has a central axis which is about ½ to 1 inch from the exposed uppermost portion of the windshield. A potentiometer or other device may be employed to adjust the light intensity. A related method is provided.

21 Claims, 3 Drawing Sheets

APPARATUS FOR REDUCING GLARE IN A VEHICLE AND ASSOCIATED METHOD

BACKGROUND OF THE INVENTION

1. Field of the Invention

The present invention relates to apparatus and a related method for reducing disabling glare and driver fatigue due to artificial or natural light-impinging on an occupant of a vehicle by effecting controlled influence on pupil size of the driver or other occupants.

2. Description of the Prior Art

An important aspect of safety and comfort of vehicle occupants is avoidance or minimizing of glare such as glare created at night due to sources of light external or internal of the vehicle. In the case of a road vehicle, such as an automobile, truck or van, for example, oncoming headlights, street lights, lights projected from the rear of the vehicle through vehicle rear view mirrors and other sources of light can cause a driver to have visual discomfort. Such fluctuations in visual acuity can result in vehicular accidents, and even if no such accidents occur, the stress of such exposure to glare can create fatigue.

Glare generally results from two sources. The first is the scatter effect of the peripheral portions of the human lens. The naturally dilated pupil changes the refractive properties of the eye. The larger the pupil opening, the more the influence the peripheral portions of the lens will have on the focusing of light rays. The peripheral portions of the lens bend the light rays differently than the nodal rays or the central rays of light. This is called night myopia. This peripheral influence results in more poorly focused rays of light which, in turn, produce a more poorly focused image. During night driving, for example, under normal circumstances, the driver's and occupant's pupils have relatively large openings to compensate for the low level of ambient light. A second effect of large pupil opening is the increase of glare as a result of the total amount of light entering the eye. The larger the pupil opening, the more light that enters the eye. As a result, the peripheral entry of light and the larger intensity of light combine to produce a poorly focused image which is generally referred to as "glare."

It has previously been suggested to employ a film over a portion of the windows of vehicles in order to minimize night glare. One of the problems with such an approach is that in excluding light to minimize glare, it also excludes light which might contribute, under certain conditions, to better vision and enhanced safety.

It has also been suggested to place a light bulb at the extreme left of the windshield so as to cause light to impinge on the eyes of the driver and the inner surface of the windshield. See U.S. Pat. No. 2,484,796. This disclosure, which also suggests the influence of color in this context, would provide primary focus on the windshield interior and would not appear to provide equal light intensity to both of the driver's eyes. It also does not disclose an elongated light source extending along the windshield.

U.S. Pat. No. 3,630,567 discloses an internal single bulb device which is said to minimize glare. It causes light to impinge on the inside of the windshield. It also provides means for controlling the intensity of the light.

U.S. Pat. No. 2,277,784 also discloses a single light source positioned to the extreme left of the windshield. The light source, which may be colored, is said to be controlled by a floor-mounted switch.

U.S. Pat. No. 1,929,298 also discloses a single bulb positioned at the left-hand side of the windshield for resisting headlight glare during night driving. A rheostat is provided to adjust the intensity of the light.

In spite of the foregoing prior art teachings, there remains a very real and substantial need for apparatus and an associated method which will effectively resist undesired glare, particularly during night driving.

SUMMARY OF THE INVENTION

The present invention has met the above-described need. The invention provides an elongated light source disposed in close proximity to the windshield and extending therealong to provide light to the eyes of the driver in order to effect miosis or constriction of the pupil, thereby reducing glare and enhancing the clarity of the images viewed. The constriction results in the light reaching the retina being primarily nodal or central rays, which require the least amount of effort to focus. This is frequently referred to as the "pin hole effect." This enhances vision. A further result is an increase in functional vision, as well as enhanced depth perception and a reduction in fatigue due to glare.

The light source may be a continuous tube, such as a fluorescent light or neon bulb. In another embodiment, it may consist of a plurality of individual bulbs.

An adjustment means, such as a potentiometer, for controlling the intensity of the light which the elongated light source emits, may be provided in the electrical line connecting the power source with the bulb, bulbs or other light source.

In a preferred embodiment, the light source is positioned above the windshield on the interior of the vehicle about ½ to 3 inches above the uppermost exposed portion of the windshield.

It is preferred that the light source extend across at least about 33 percent of the windshield starting to the left of the driver. If it is desired to offer this protection to a passenger in the front seat, the light source may extend about 40 to 90 percent of the average width of the windshield.

In a method of the invention, an elongated light source is provided on the interior of the vehicle closely adjacent to and above the windshield such that illumination from the light source will provide substantially equal illumination to the pupils of both eyes of the driver. This results in reduction of glare and resultant fatigue.

If desired, the bulbs or other light source may be colored, such as blue, red or amber, in order to enhance the effect.

It is an object of the present invention to provide apparatus and an associated method for effectively reducing glare experienced by occupants of a vehicle, particularly during night driving.

It is another object of the invention to provide such a system wherein an elongated light source positioned above the windshield extends thereacross to provide substantially uniform light to both pupils to effect miosis of the driver.

It is a further object of the present invention to provide such a system which may be extended so as to provide similar benefits to an occupant of the front seat adjacent to the driver's seat.

It is another object of the invention to provide such a system wherein the elongated light source may be retrofitted into a vehicle or may be provided as original equipment.

It is yet another object of the invention to provide such a light system wherein the intensity of light may be varied to accommodate the preferences or needs of an individual occupant.

These and other objects of the present invention will be more fully understood from the following description of the invention on reference to the drawings appended hereto.

DESCRIPTION OF THE PREFERRED EMBODIMENT

As used herein, reference to "vehicle" shall refer to automobiles, vans, trucks, school buses, motor homes, and other types of recreational vehicles, as well as other types of land vehicles, watercraft and aircraft.

Figure 1:
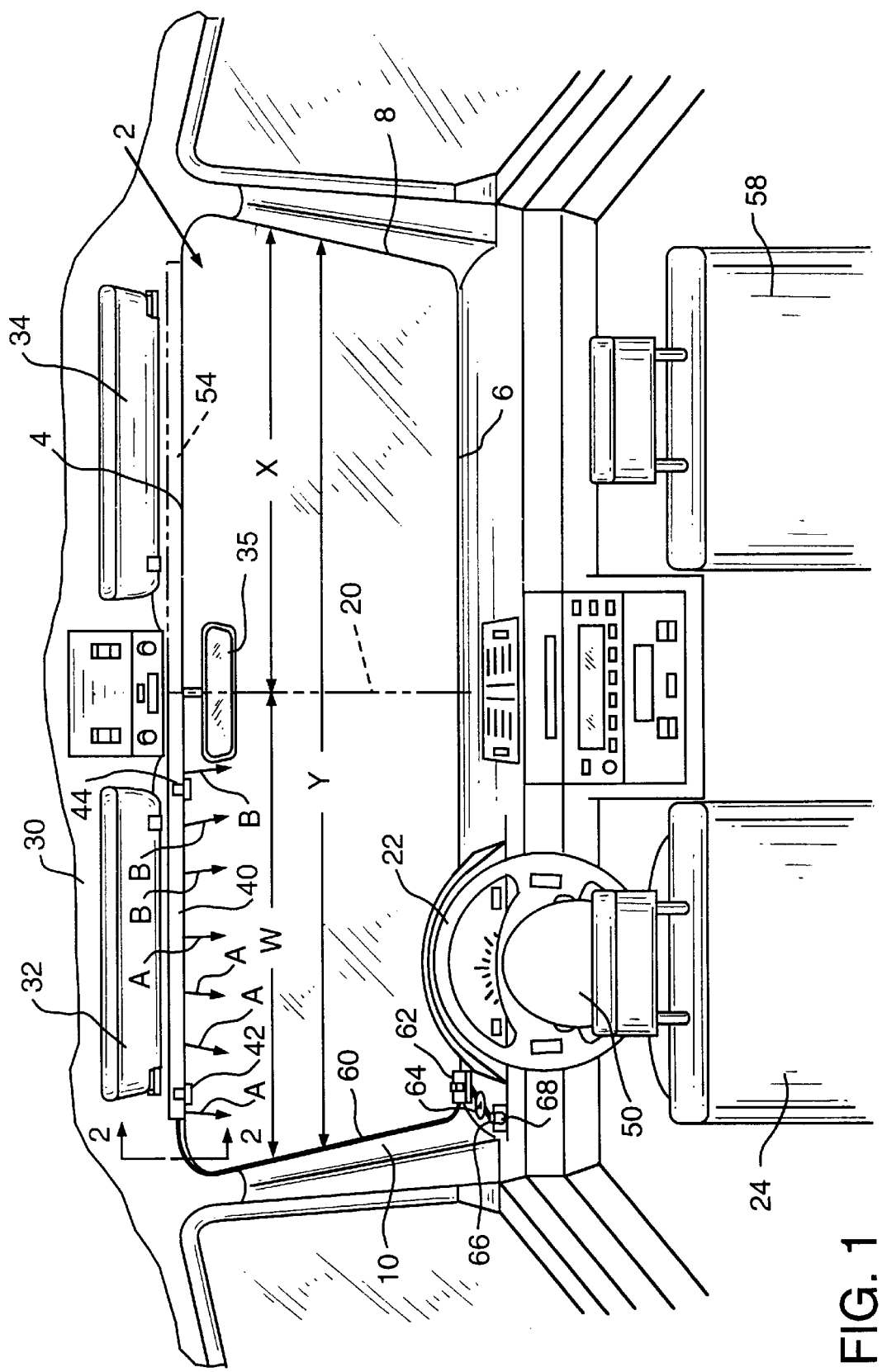
FIG. 1 is a schematic fragmentary view of a portion of the vehicle showing the windshield as viewed from the interior of the vehicle.

Referring to FIG. 1, there is shown as viewed from the interior of the vehicle a windshield 2 having an upper edge 4, a lower edge 6 and lateral edges 8, 10. The windshield 2, in the form shown, diverges generally upwardly and has an overall average width Y with a driver's portion having an average width W and the passenger front seat portion having an overall average width X with the imaginary line of division being indicated by the reference number 20. The steering wheel 22 is positioned forwardly of the front seat 24 which is shown in fragmentary fashion. The ceiling 30 overlying the windshield 2 has a rotatable visor 32 on the driver's side and rotatable visor 34 on the passenger's side. A conventional rearview mirror 35 is provided.

Figure 2:
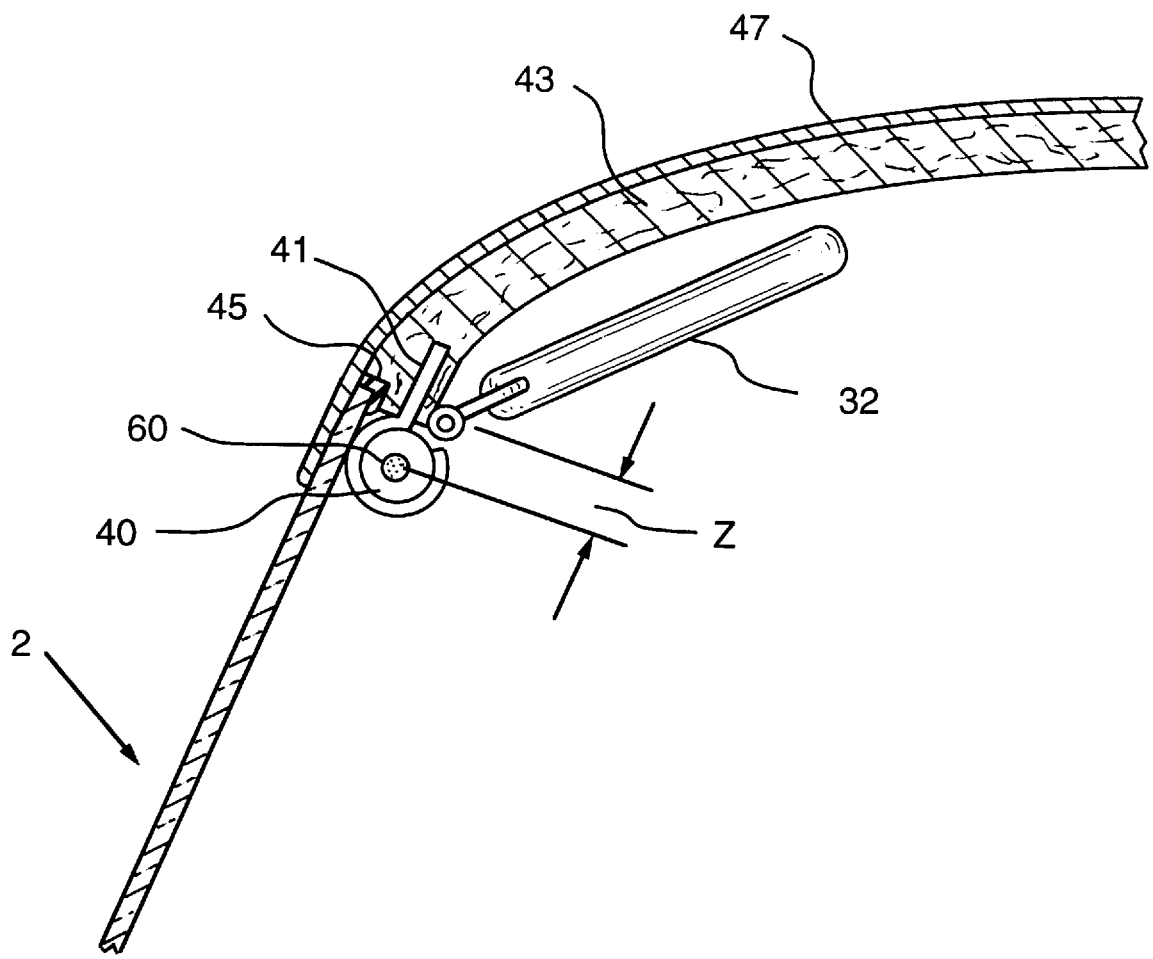
FIG. 2 is a cross-sectional partially schematic illustration taken through 2—2 of FIG. 1, showing a portion of the windshield and an elongated light source of the present invention.

Referring to FIGS. 1 and 2, an elongated light source 40 which, in the form shown, is a fluorescent bulb which is shown as being secured to the vehicle through a pair of clamps 42, 44 which have a fin 41 secured within ceiling material 43 which may have a suitable resilient seal 45 in engagement with the upper end of windshield 2. The roof 47 overlies ceiling 43. It will be appreciated that light emitted by the light source will emerge in a direction generally perpendicular to the longitudinal axis of light source 40 in the direction indicated by arrows, such as A and B. This causes light of substantially uniform intensity to impinge on the head 50 of the driver shown schematically in FIG. 1. The driver's eyes will, therefore, each receive light of substantial intensity. It will be appreciated that the elongated light source 40 be disposed generally adjacent to the upper edge 4 of the windshield. It extends along the length of the windshield and may extend into region 54 which is disposed in front of the passenger seat 58 which is shown schematically. This can be done with one elongated light source or two or more such light sources as desired. If desired, the light source may be provided as an elongated light source overlying the driver's door window and passenger door window. This will provide similar benefits when the driver looks through the respective door windows.

While a variety of elongated light sources may be employed, it is generally preferred that the light source be selected from the group consisting of incandescent bulbs, fluorescent bulbs and neon bulbs. Fiber optic light sources having an adequate light discharge surface may be used. It will be appreciated that by causing light of the desired intensity to impinge substantially equally upon both of the eyes of the driver, constriction of the pupils is effected to thereby minimize the undesired consequences of external or internal light sources, such as oncoming headlights or light reflected by the vehicle's mirrors or other originating inside the vehicle, for example.

With reference to FIG. 2, it is seen that the distance between the longitudinal axis of light bulb 40 and the uppermost exposed surface of the windshield is Z. This dimension may be about ½ to 3 inches and preferably about ½ to 1 inch. In general, it is preferred that the elongated light source, such as 40, extend at least about 33 percent of the average total width Y of the windshield beginning with the left end and the most preferred would be to have it extend at least the width W of the driver's portion of the windshield. Where the passenger is also to receive such protection, it is preferred that beginning at the left-hand end of the windshield 2 that the elongated light source extend about 40 to 100 percent of the average width Y of the windshield and preferably about 90 to 100 percent.

A wire 60 is operatively associated with the light source 40 and has a suitable on/off switch 62 associated therewith. In a preferred form, a potentiometer, such as 64, or other means for adjusting the intensity of the emitted light, will be provided. A suitable source of power which may be a plug 66, which enters into an electrically energized socket 68 of the vehicle, may be provided. In an alternative manner, in a permanent installation, the wire may be operatively associated with the vehicle battery with the switch permanently installed. If desired, the apparatus could be made as a light source which is removably secured as by being clipped to a visor such as 32 and plugged in to a cigarette lighter.

Figure 3:
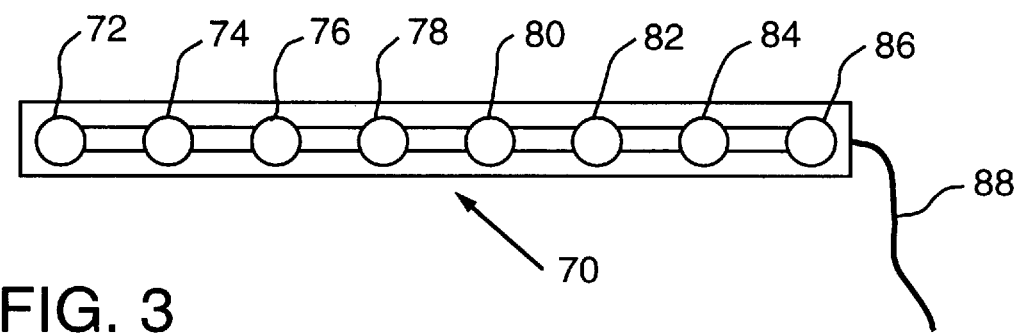
FIG. 3 is an illustration of an alternate embodiment of an elongated light source of the present invention.

Referring to FIG. 3, another embodiment of the invention will be considered. In this embodiment, the elongated light source 70 has a plurality of individual light bulbs 72, 74, 76, 78, 80, 82, 84, 86 which may be energized in series through wire 88 or in parallel, if desired. In this embodiment, also, it will be appreciated that the source of light extends across the windshield and thereby provides light of substantially uniform intensity to both eyes of the driver.

The bulbs may be colored, if desired. Blue, red or amber colors are preferred colors.

Figure 4:
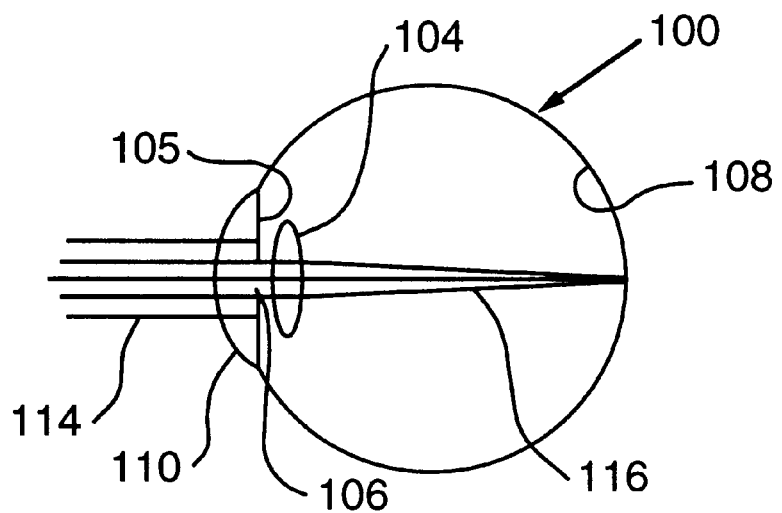
FIG. 4 is a schematic cross-sectional illustration showing a human eye with the pupil at a normal, small opening size.
Figure 5:
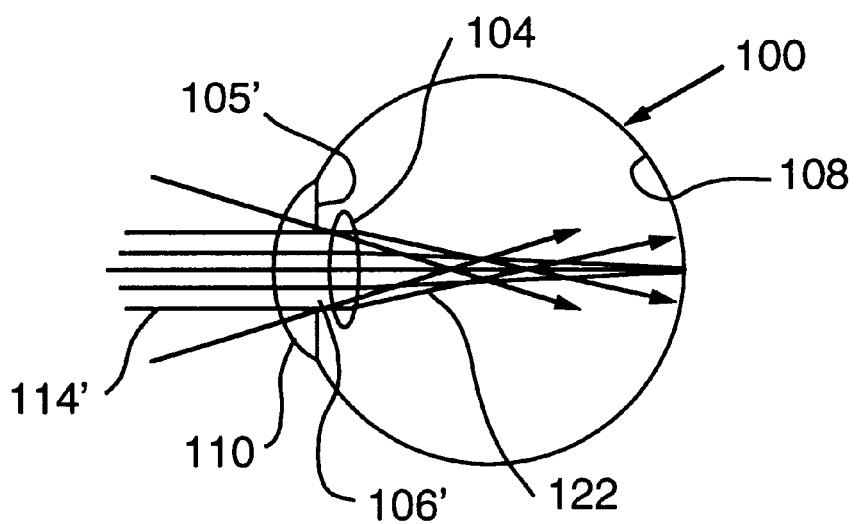
FIG. 5 is an illustration similar to FIG. 4, but showing the pupil enlarged.

Referring to FIGS. 4 and 5, it will be noted that the eye 100, has a lens 104, an iris 105, which has the iris 105 with pupil 106 in FIG. 4 shown with its normal or small opening and, in FIG. 5, the pupil 106' dilated to provide a large opening.

It will be appreciated that in FIG. 4, the impinging light 114 has a series of parallel light beams with those passing through the cornea 110 and pupil 106 being caused by lens 104 to assume a converging path of travel as shown by the light beams 116 in FIG. 4. Light beams 116 impinge on the retina 108 which, as is known to those skilled in the art, has a plurality of cones and rods which respond to the impinging light and through the optic nerve transmits the information to the brain.

It is noted in FIG. 4 that the light beams 114 passing through the normal pupil opening 106 passes through a central portion of the lens 104. By contrast, as shown in FIG. 5, with the enlarged pupil opening 106', more of the light beams 114' which passes through the pupil and the lens creates a more distorted scattering of light beams as shown by light beams 122 thereby creating a distorted image as the light beams impinge on retina 108. The present invention, by providing the illumination disclosed herein, resists the normal inclination of the pupil to enlarge in a darkened environment and thereby tends to maintain the condition shown in FIG. 4 which facilitates better vision.

It will be appreciated from the foregoing that the present invention has provided an effective means of minimizing the deleterious effect of glare and poorly focused images which result from enlarged pupils under normal night vision conditions. The achievement of miosis or constriction of the pupils is accomplished by providing an elongated light source in front of the driver or in front of the driver and front-seat passenger.

Reference herein to an elongated light source will include the use of a single elongated light source, as well as a plurality of light sources.

While for purposes of illustration herein, the preferred embodiment involving external or internal night light sources has been disclosed, the invention is not so limited. For example, the invention may be employed beneficially in parking garages, such as subterranean illuminated parking garages, for example, and in sunlight.

Whereas particular embodiments of the invention have been described herein for purposes of illustration, it will be appreciated by those skilled in the art that numerous variations of the details may be made without departing from the invention as described in the appended claims.

What is claimed is:

1. A vehicle having glare-reducing apparatus comprising said vehicle having a windshield and a driver's seat disposed rearwardly of said windshield, an elongated light source disposed above, adjacent to and extending across a substantial portion of the windshield disposed adjacent to said driver's seat, and said elongated light source being positioned and structured to direct light emitted by said light source onto the face of said driver and constrict the pupils of said driver's eyes thereby reducing glare.

2. The vehicle of claim 1 wherein said light source includes a continuous bulb.

3. The vehicle of claim 2 wherein said light source extends across at least 33 percent of the average width of the total windshield.

4. The vehicle of claim 3 wherein said light source has at least one bulb selected from the group consisting of incandescent bulbs, fluorescent bulbs and neon bulbs.

5. The vehicle of claim 1 wherein said light source is disposed within said vehicle in a position above said windshield.

6. The vehicle of claim 1 wherein said light source extends about 40 to 100 percent of the average width of said entire windshield.

7. The vehicle of claim 1 wherein means for adjusting the relative intensity of the light emitted from said elongated light source.

8. The vehicle of claim 7 wherein said means for adjusting includes a potentiometer.

9. The vehicle of claim 1 wherein said light source being colored.

10. A vehicle having glare-reducing apparatus comprising said vehicle having a windshield and a driver's seat disposed rearwardly of said windshield, an elongated light source disposed adjacent to and extending across a substantial portion of the windshield disposed adjacent to said driver's seat, whereby light emitted by said light source will impinge on the face of said driver and constrict the pupils of said driver's eyes thereby reducing glare, said light source being colored, and said light source color being selected from the group consisting of blue, red and amber.

11. The vehicle of claim 1 wherein said elongated light source being structured to provide substantially identical light intensity to both of the driver's eyes.

12. The vehicle of claim 1 wherein said elongated light source having a plurality of individual bulbs.

13. The vehicle of claim 1 wherein said light source having a longitudinal axis which is disposed within about ½ to 3 inches from the uppermost edge of said windshield.

14. The vehicle of claim 8 wherein said potentiometer is connected to electrical conductor means which, in turn, are connected to said elongated light source and a source of electrical energy.

15. A method of resisting glare on the occupant of a vehicle wherein providing an elongated light source disposed generally adjacent to the upper edge of and extending across a substantial portion of the vehicle windshield, energizing said elongated light source so as to impose substantially equal light intensity on both eyes of said occupant, and employing light of sufficient intensity to constrict the pupils of said occupant's eyes.

16. The method of claim 15 including employing said method on the driver of said vehicle.

17. The method of claim 15 including employing said method on both the driver of said vehicle and an occupant of a seat adjacent to said driver.

18. The method of claim 15 including employing as said light source a light source having an elongated continuous bulb.

19. The method of claim 15 including employing as said light source a light source having a plurality of spaced bulbs.

20. The method of claim 15 including providing said light source along at least 33 percent of the average width of the windshield beginning from the left end of the windshield as viewed from within the vehicle by said driver.

21. The method of claim 20 including providing said light source adjacent to an upper portion of the window in the door adjacent said driver.

* * * * *

UNITED STATES PATENT AND TRADEMARK OFFICE
CERTIFICATE OF CORRECTION

PATENT NO. : 6,056,424
DATED : May 2, 2000
INVENTOR(S) : Charles DiNunzio

Page 1 of 1

It is certified that error appears in the above-identified patent and that said Letters Patent is hereby corrected as shown below:

Column 6,
Line 30, "wherein" should read -- including --.

Signed and Sealed this

Twenty-second Day of January, 2002

Attest:

Attesting Officer

JAMES E. ROGAN
Director of the United States Patent and Trademark Office